(12) United States Patent
Kozlowski et al.

(10) Patent No.: US 8,721,163 B2
(45) Date of Patent: May 13, 2014

(54) AGITATOR RELEASE FOR A FOOD MIXER

(75) Inventors: Eugene J. Kozlowski, Medina, OH (US); David J. Kolar, Stow, OH (US); Glenn F. Brasdovich, Olmsted Township, OH (US); Kenneth W. Bair, Akron, OH (US)

(73) Assignee: Vita-Mix Corporation, Cleveland, OH (US)

( * ) Notice: Subject to any disclaimer, the term of this patent is extended or adjusted under 35 U.S.C. 154(b) by 1105 days.

(21) Appl. No.: 12/660,707

(22) Filed: Mar. 4, 2010

(65) Prior Publication Data

US 2011/0216623 A1 Sep. 8, 2011

(51) Int. Cl.
*B01F 7/16* (2006.01)

(52) U.S. Cl.
USPC .......................................... 366/197; 366/199

(58) Field of Classification Search
USPC ......... 366/197, 199, 203, 207, 279, 331, 343, 366/315
See application file for complete search history.

(56) References Cited

U.S. PATENT DOCUMENTS

| 3,533,218 A | * | 10/1970 | Hunt et al. ................... 96/102 |
| 3,533,715 A |   | 10/1970 | Gross |
| 3,619,754 A | * | 11/1971 | Fuchs ........................... 318/445 |
| 4,071,789 A |   | 1/1978  | Ernster et al. |
| 5,803,598 A |   | 9/1998  | Harry et al. |
| 5,911,505 A | * | 6/1999  | St. John et al. ............... 366/200 |

FOREIGN PATENT DOCUMENTS

WO    WO 88/01199    2/1988

* cited by examiner

*Primary Examiner* — Tony G Soohoo
(74) *Attorney, Agent, or Firm* — Renner, Kenner, Greive, Bobak, Taylor & Weber

(57) ABSTRACT

A machine (10) for mixing food products includes a motor (22) which turns a hollow shaft assembly (28) that carries an agitator (40). An assembly (70) for releasing the agitator (40) from the shaft assembly (28) includes a solenoid (71) which pivots an arm (74) that engages a plunger (80). The plunger (80) includes a pin (81) which is received in the hollow shaft assembly (28) and which engages the agitator (40) upon activation of the solenoid (71) to release the agitator (40) from the hollow shaft assembly (28).

15 Claims, 7 Drawing Sheets

AGITATOR RELEASE FOR A FOOD MIXER

TECHNICAL FIELD

This invention relates to a device which mixes food products, such as soft serve products, frozen drinks or the like, with a disposable agitator carried on a rotating shaft. More specifically, this invention relates to such a device which will automatically release the agitator from the shaft when the mixing is completed.

BACKGROUND ART

Food mixing machines are commonly utilized by fast food establishments or the like, particularly those that blend condiments or other foods into ice cream in a container for consumption by the customer with a spoon. The blending is typically performed by an agitator carried at the bottom of a rotating shaft. The ice cream and other foods to be blended are put into a container and the agitator is positioned in the ice cream to blend the product. After use, the agitator must be cleaned to avoid contamination of the next product to be blended.

In order to avoid the step of cleaning the agitator, disposable agitators have been developed which are placed on the rotating shaft prior to use, and removed from the rotating shaft after use. As a result, the shaft does not need to be cleaned between each usage.

Some of those disposable agitators have been formed in the shape of a spoon. In those devices, the bowl of the spoon mixes the product and the handle of the spoon is hollow and is received over at least a portion of the rotatable shaft of the food mixer. The spoon shaft is provided with a clip which is snapped over a rib provided on the rotatable shaft to attach the spoon to the shaft. The product is then blended and the spoon removed from the shaft. This system is advantageous not only because of the saving the time by not having to clean the agitator after each use, but also the spoon can be given to the user to consume the food thereby saving the establishment the cost of providing conventional spoons to the customer.

The fast food establishments are always striving to make these machines more automatic for the ease of operation by the user. Yet the user is still required to remove the disposable agitator from the rotating shaft which is not always a simple procedure. When the agitator is in the shape of a spoon, at least the customer is induced to remove it from the shaft, but no existing machine includes the feature of automatically releasing the disposable agitator from the shaft without the need for the customer to manually grasp and remove it.

DISCLOSURE OF THE INVENTION

It is thus an object of one aspect of the present invention to provide a food mixing machine which will release a disposable agitator for a rotating shaft without manual engagement of the agitator by the user.

It is an object of another aspect of the present invention to provide a food mixing machine, as above, which will release the agitator automatically.

These and other objects of the present invention, as well as the advantages thereof over existing prior art forms, which will become apparent from the description to follow, are accomplished by the improvements hereinafter described and claimed.

In general, a machine for mixing food products made in accordance with the present invention includes a rotatable shaft assembly and an agitator carried by the shaft assembly and adapted to mix the food products. Means are provided to release the agitator from the shaft assembly.

In accordance with another aspect of the present invention, a machine for mixing food products includes a rotatable hollow shaft assembly and an agitator carried by the shaft assembly and adapted to mix the food products. A plunger has a stem which is received in the hollow shaft assembly, and means are provided to move the stem through the hollow shaft assembly to engage the agitator to remove the agitator from the shaft assembly.

A preferred exemplary food mixing machine according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
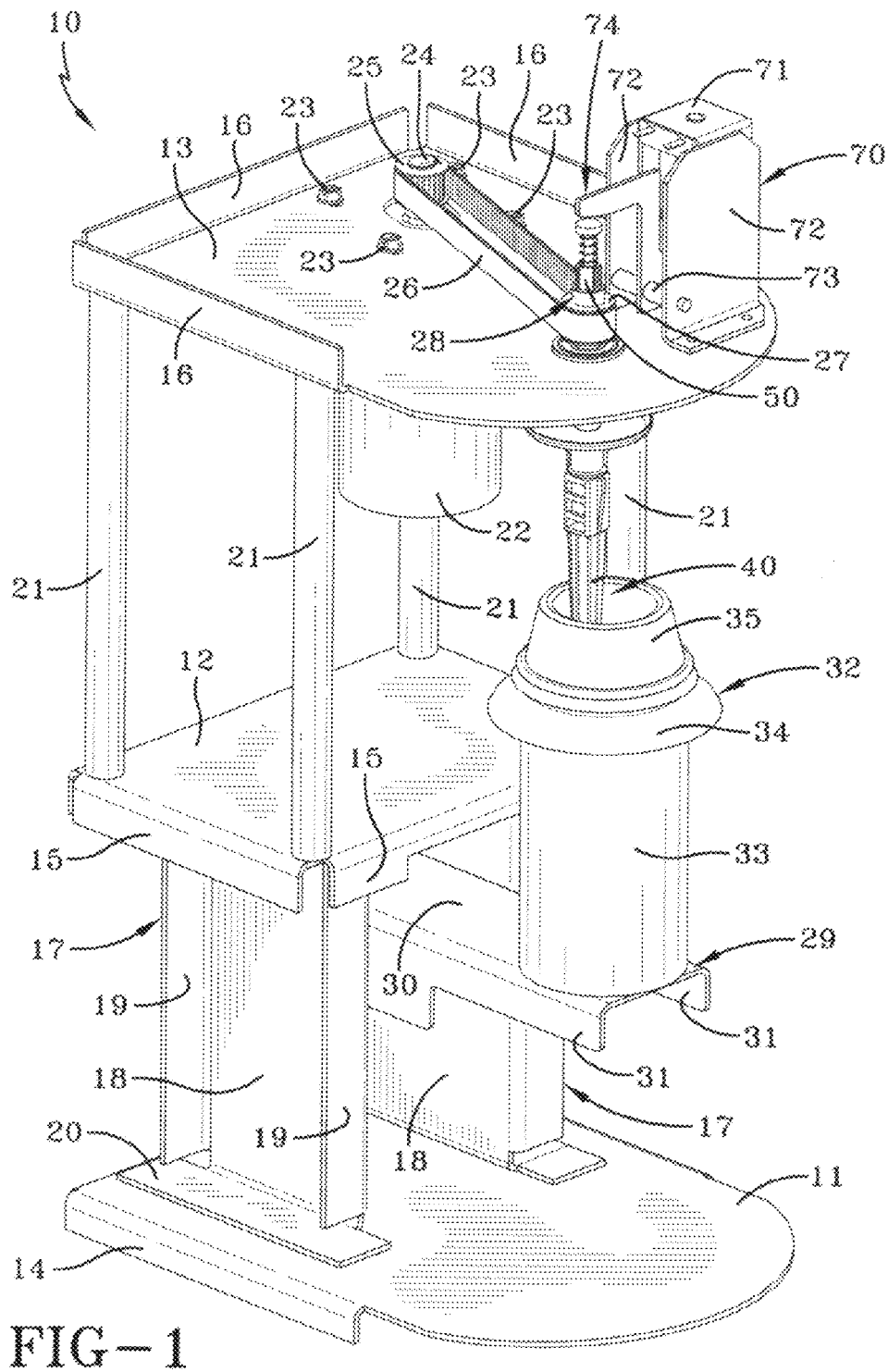
FIG. 1 is a somewhat schematic perspective view of a food mixing machine having the agitator release feature of the present invention and showing the agitator mixing food in a cup.

A food mixing machine having an agitator release feature made in accordance with the present invention is generally indicated by the numeral 10. Machine 10 is somewhat schematically shown and many of its details which do not relate to the agitator release feature are not shown. However, for the full understanding of a typical machine 10 and its operation, reference is made to pending U.S. patent application Ser. No. 12/460,273 filed Jul. 17, 2009, which is incorporated herein by reference.

Regarding those features of machine 10 shown herein, included are a bottom plate 11, an intermediate plate 12 and a top plate 13. Bottom plate 11 is provided with downwardly directed flanges 14 at the sides and rear thereof, intermediate plate 12 is provided with downwardly directed flanges 15 at the sides and rear thereof as well as partially along its front, and top plate is provided with upwardly directed flanges 16 at the sides and rear thereof. Flanges 14, 15 and 16 are adapted to receive and carry a housing (not shown) in a conventional fashion.

Intermediate plate 12 is carried spaced from bottom plate 11 by opposed box frames generally indicated by the numeral 17 and positioned on each side of machine 10. Each box frame 17 includes an upstanding plate 18, opposed side plates 19, and opposed top and bottom plates 20. Bottom plates 20 are attached to the top of machine bottom plate 11, and the top end plate (not shown) is attached to the bottom of intermediate plate 12. As such, box frames 17 support intermediate plate 12 spaced above bottom plate 11.

Top plate 13 is carried spaced from intermediate plate 12 by opposed posts 21 located between the corners of plates 12 and 13. As such, posts 21 support top plate 13 spaced above intermediate plate 12.

An agitator motor 22 is carried by top plate 13, as by bolts 23, and is thereby suspended between top plate 13 and intermediate plate 12. Motor 22 rotates a shaft 24 which carries a pulley 25. A belt 26 extends between pulley 25 and a pulley 27 carried by an agitator shaft assembly generally indicated by the numeral 28. Thus, through belt 26, motor 22 turns agitator shaft assembly 28 which extends through, and downwardly from, top plate 13.

Machine 10 also includes a travel plate generally indicated by the numeral 29. Travel plate 29 is generally u-shaped in configuration having a platform portion 30 and opposed branches 31 extending downwardly from the periphery of platform 30. A holder for a container such as a cup or the like is generally indicated by the numeral 32 and includes a cylindrical body portion 33. Body portion 33 is hollow so as to receive a food holding cup (not shown) and is surrounded at its upper periphery by an arcuate flange 34. A removable domed lid 35 may be provided at the top of holder 32 to reduce the possibility of the splashing of food out of the cup in which it is being mixed. As described in U.S. patent application Ser. No. 12/460,273, holder 32 may be rotated, if desired, by a motor (not shown) carried by travel plate 29, and travel plate 29 is moved upwardly and downwardly by a motor (not shown) which may be carried by intermediate plate 12.

Agitator shaft assembly 28, which is hollow throughout its length, carries an agitator, generally indicated by the numeral 40, which can take on any conventional shape but is shown as being in the shape of a spoon. As such, agitator 40 is preferably a plastic member having a stem portion, generally indicated by the numeral 41, a shaft coupler portion, generally indicated by the numeral 42 and formed at one end of stem 41, and a blade portion 43 which is in the shape of the bowl of a spoon formed at the other end of stem 41.

Coupler portion 42 of agitator 40 includes a generally rectangular hollow socket 44 having a bottom surface 45 and being open at the top. A flexible clip 46 extends upwardly from the socket 44 and carries a lock barb 47 positioned above the top of socket 44. The stem portion 41 of agitator 40 includes opposed side walls 48 shaped by a central wall 49. Walls 48 and 49 extend downwardly from bottom surface 45 of socket 44 to blade portion 43.

Figure 6:
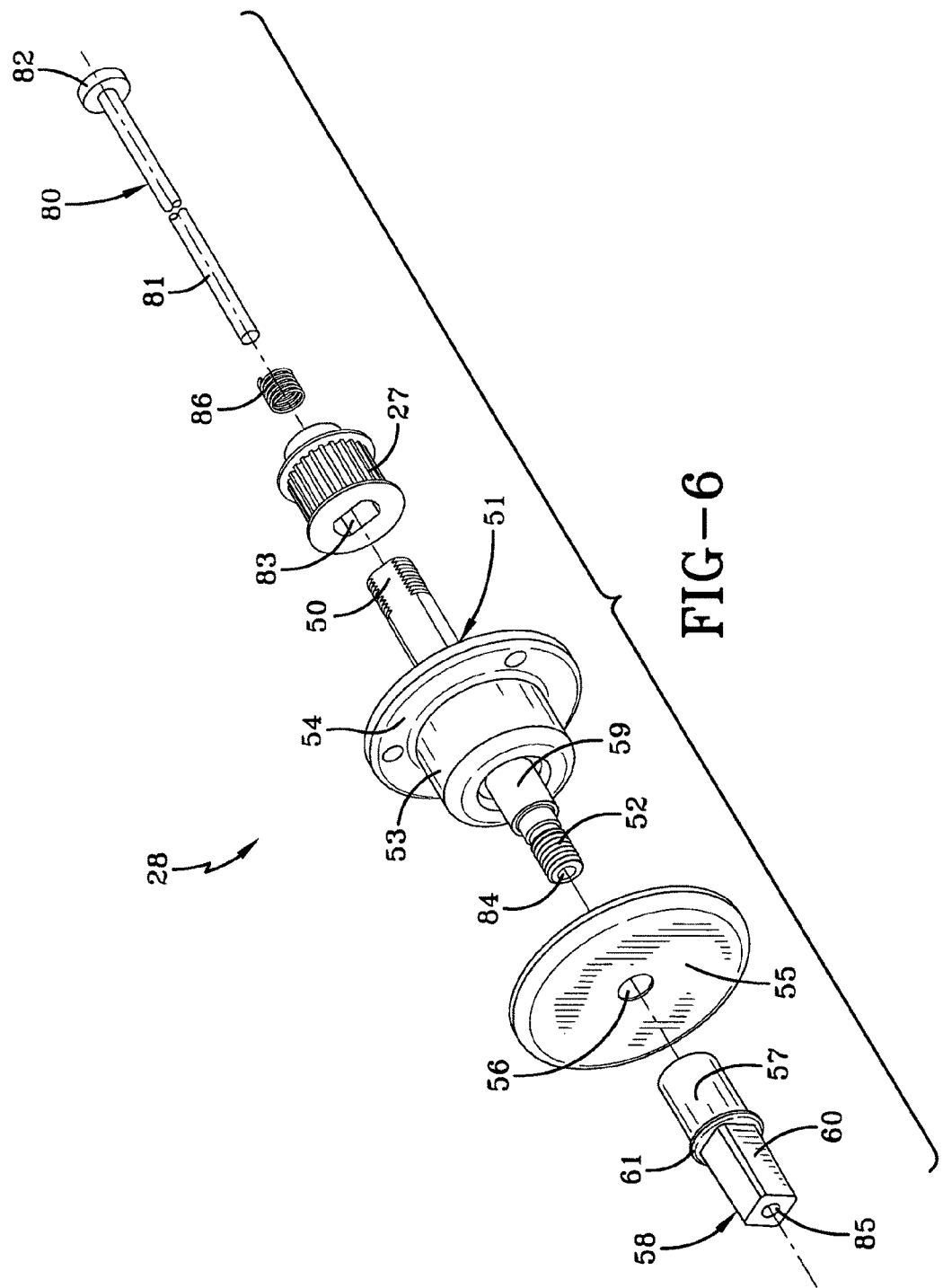
FIG. 6 is an exploded view of the rotatable shaft of the food mixing machine as well as some of its agitator releasing components.

The details of shaft assembly 28 are best shown in the exploded view, FIG. 6. One end 50 of a segment 51 of shaft assembly 28 is received in pulley 27 and is configured as a double D so that it will rotate with pulley 27. The other end of shaft segment 51 is threaded, as at 52. Shaft segment 51 extends through a bearing assembly 53 having a mounting flange 54 extending radically outwardly therefrom. Mounting flange 54 is attached to top plate 13 of machine 10. A slinger disk 55 may be provided to assure that food being mixed does not splash upwardly into the workings of shaft assembly 28, its motor 22 and the like. The threaded end 52 of shaft segment 51 extends through an opening 56 in slinger 55 and is received in an internally threaded tube portion 57 of an agitator driver generally indicated by the numeral 58. Slinger disk 55 is maintained in proper position along shaft segment 51 as it is sandwiched between tube 57 and a spacer 59 which positioned around shaft segment end 52 and which bears against the end of shaft segment 50 opposite to its end received in pulley 27. The end of shaft assembly 28 is defined by a square drive end 60 of agitator driver 58. A lock flange 61 is provided between drive end 60 and tube 57. Thus, shaft assembly 28 extends from end 50 of shaft segment 51 to drive end 60.

Figure 7A:
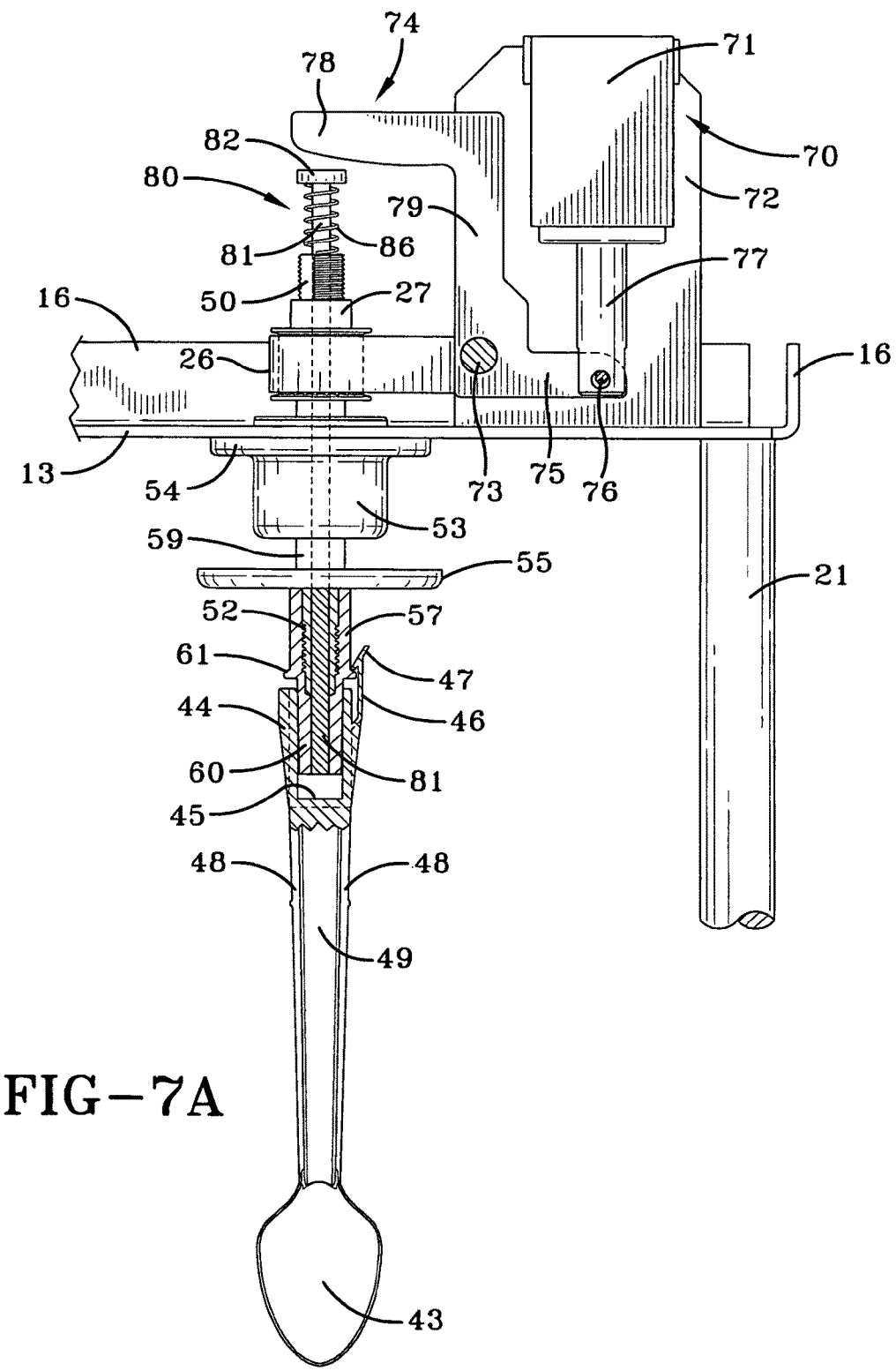
FIG. 7A is a fragmented sectional view taken substantially along line 7A-7A of FIG. 2.

To attach agitator 40 to shaft assembly 28, shaft drive end 60 is received in shaft coupler portion 42 of agitator 40. As the agitator 40 is being moved upwardly to accomplish such connection, clip 46 flexes until lock barb 47 snaps over lock flange 61 of agitator driver 58. As such, and as shown in FIG. 7A, shaft assembly 28 carries agitator 40.

Agitator 40 may be manually removed from shaft assembly 28 by merely pulling down on agitator 40. However, it has been found desirable, and it is an object of the present invention, to provide an automatic release of the agitator 40 from the shaft assembly 28. To that end, an agitator release assembly, generally indicated by the numeral 70, is provided.

Release assembly 70 includes an activation device shown to be in the form of a solenoid 71 carried between opposed bracket walls 72 which are mounted on top plate 13 of machine 10. However, any suitable activation device, such as a pneumatic or hydraulic cylinder, could be utilized without departing from the concept of the present invention. A pivot pin 73 extends between bracket walls 72 and carries a somewhat Z-shaped actuating arm generally indicated by the numeral 74. As best shown in FIG. 7A, arm 74 includes a normally horizontally positioned base 75 attached at one end to pin 73, and attached, as by a pin connection 76, to a plunger 77 of solenoid 71. Arm 74 also includes a normally horizontally positioned lever 78 which is connected to base 75 by a normally generally vertical portion 79 of arm 74 thereby forming the Z-shape. Lever 78 thus extends outwardly from between bracket walls 72.

Figure 7B:
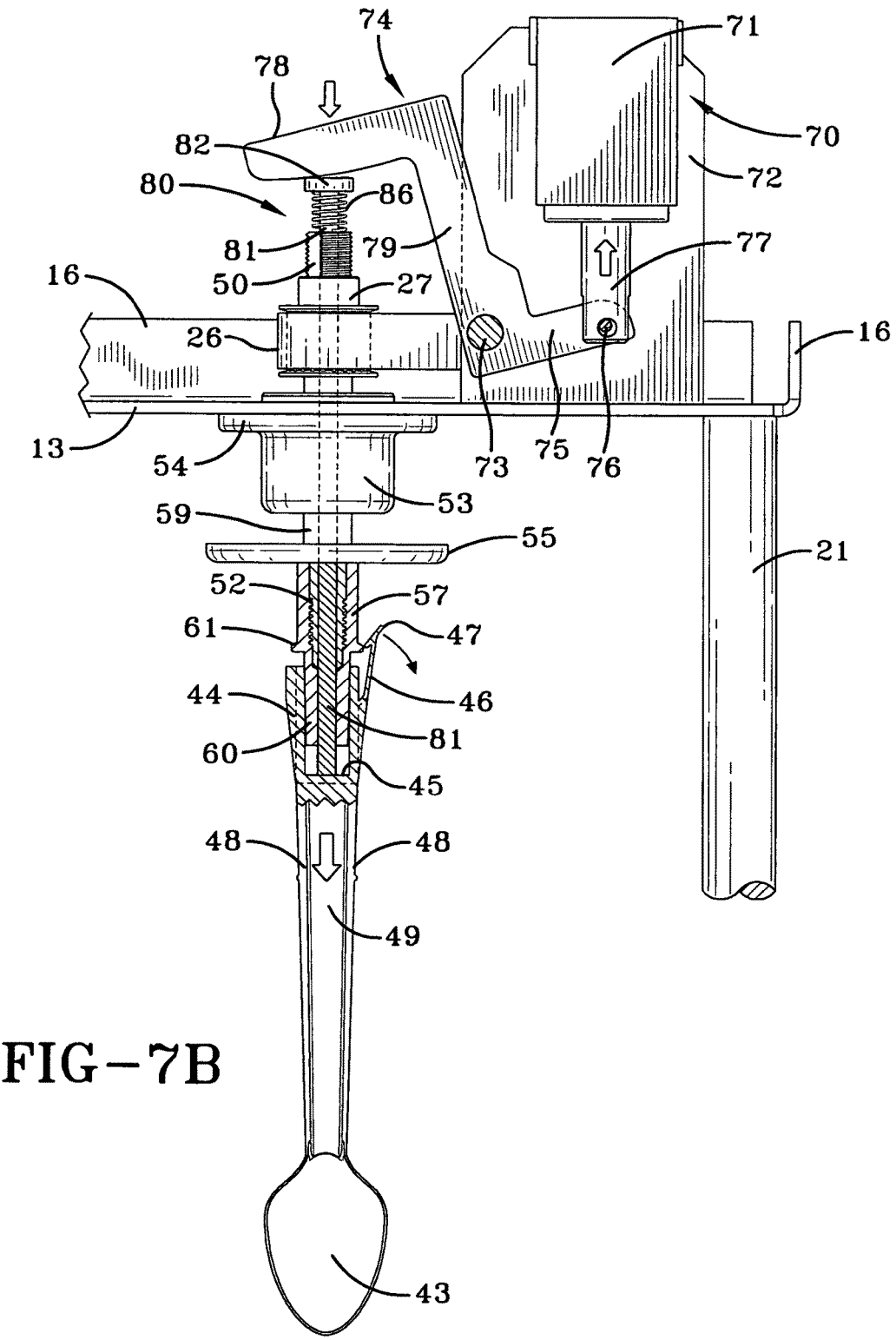
FIG. 7B is a fragmented sectional view like FIG. 7A sequentially following FIG. 7A and showing the agitator as it is being released.
Figure 7C:
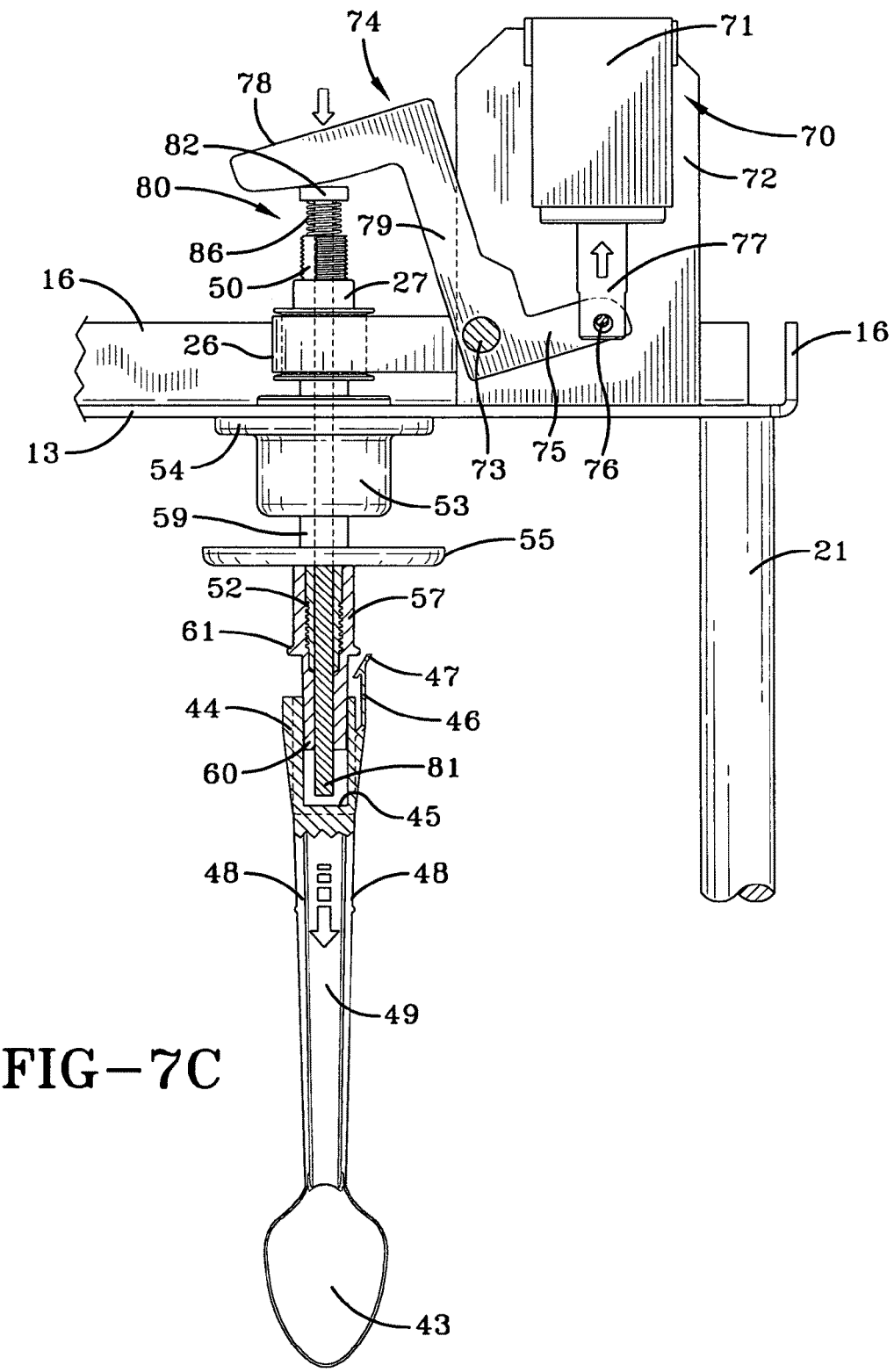
FIG. 7C is a fragmented sectional view like FIGS. 7A and 7B sequentially following FIG. 7B and showing the agitator fully released.

A agitator-ejecting plunger is generally indicated by the numeral 80 and is in the form of an elongate pin 81 having an enlarged head 82 at one end thereof. Pin 81 extends through an aperture 83 in pulley 27, an aperture 84 in shaft segment 51, and into an aperture 85 in agitator driver 58. As such, in its normal position with agitator 40 connected to driver 58 as shown in FIG. 7A, the bottom of pin 81 is just above the bottoms surface 45 of agitator socket 44. At this time the head 82 of plunger 80 is positioned just below lever 78 of arm 74. Upon activation of solenoid 71, its plunger 79 moves upwardly as shown in FIGS. 7B and 73 thereby pivoting arm 74 on pin 73 at which time lever 78 engages head 82 of plunger 80 and overcomes the bias of a spring 86 positioned around pin 81 between head 82 and the end 50 of shaft segment 51. Such causes the bottom of pin 81 to move through driver 58 and engage the bottom surface 45 of agitator socket 44. Thus, as shown in FIG. 7B, clip 46 flexes until barb 47 passes over lock flange 61 of driver 58 and agitator 40 is thereby released as shown in FIG. 7C. When solenoid 71 is de-energized, arm 74 returns to the FIG. 7A position and spring 86 acts on plunger head 82 to return plunger 80 to its normal inactive position. It should also be noted that a solenoid could be positioned so as to directly act on plunger 80 thereby eliminating the need for actuating arm 74 if that would be desired in some instances. In addition, it is contemplated that the agitator 40 may be carried directly by the shaft of the motor 22 which would thus be mounted on top plate 13 directly above cup holder 32. In this instance, the shaft of motor 22 would be hollow to receive plunger pin 81, and solenoid 71 would be positioned on top of the motor 22 so as to be able to engage the plunger 80.

Figure 2:
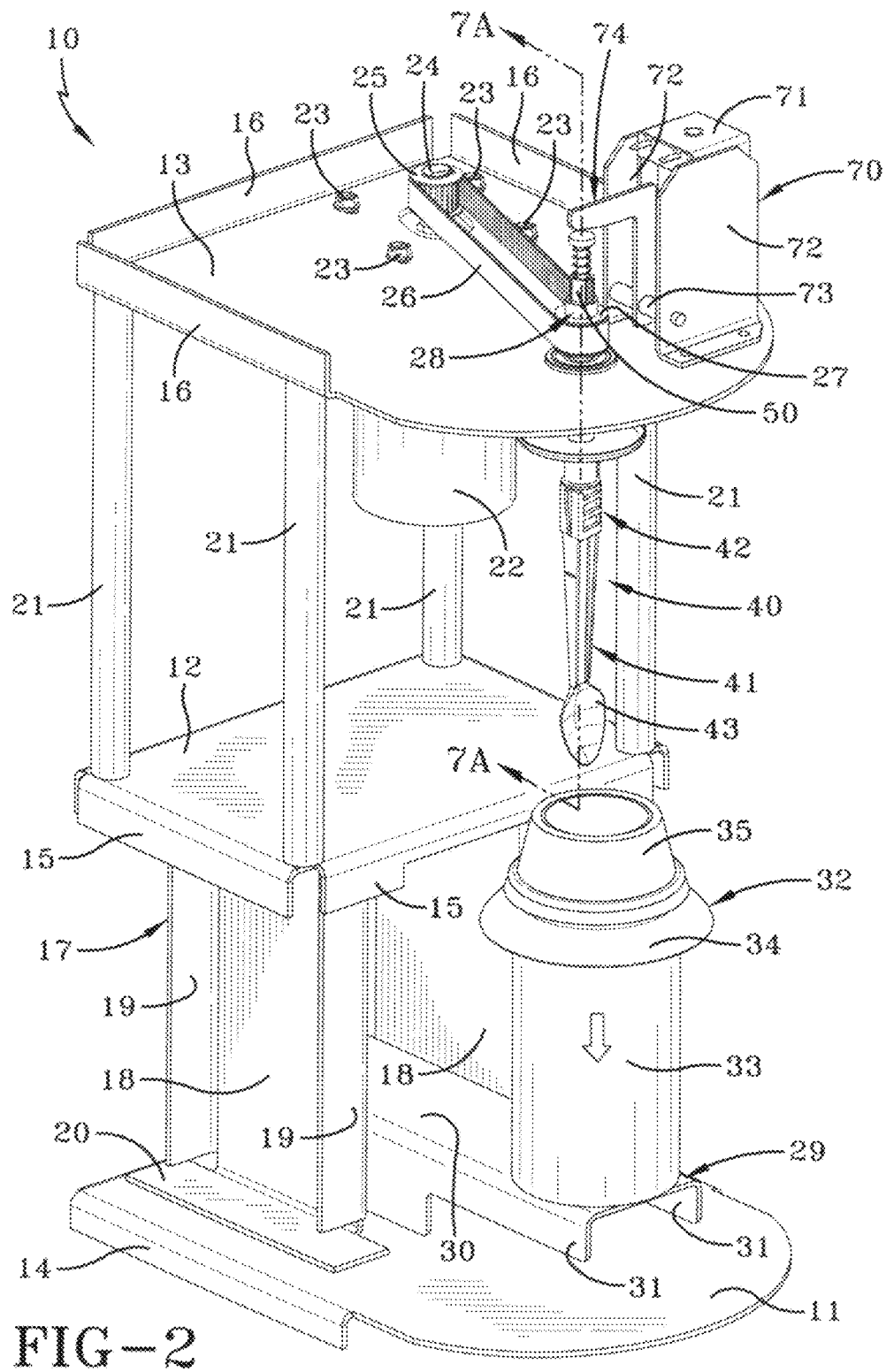
FIG. 2 is a perspective view like FIG. 1 but showing the agitator out of the cup.
Figure 3:
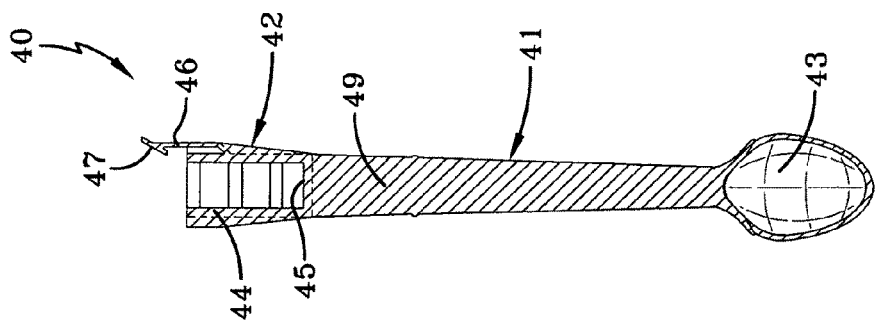
FIG. 3 is a perspective view of a disposable agitator being in the shape of a spoon.
Figure 4:
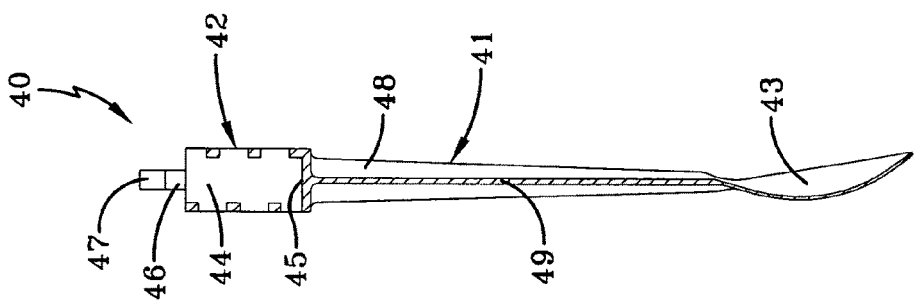
FIG. 4 is a sectional view taken substantially along line 4-4 of FIG. 3.
Figure 5:
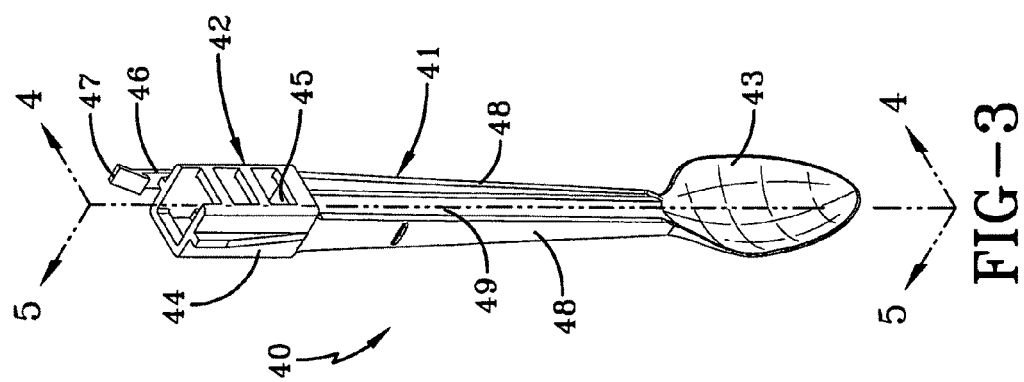
FIG. 5 is a sectional view taken substantially along line 5-5 of FIG. 3.

In all instances, solenoid 71 could be operated by the user of machine 10 at the appropriate time when agitator release was desired, as by pushing a button on the control panel of machine 10, or solenoid 71 could be automatically activated at the appropriate time at the end of a mixing cycle, for example, as shown in FIG. 2, or as the machine 10 was moving from the FIG. 2 to the FIG. 1 position.

In view of the foregoing, it should be evident that a machine 10, provided with an agitator release assembly 70 constructed as described herein substantially improves the art and otherwise accomplishes the objects of the present invention.

What is claimed is:

1. A machine for mixing food products comprising a rotatable shaft assembly, an agitator carried by said shaft assembly and adapted to mix the food products, and means to release said agitator from said shaft assembly, wherein said means to release includes a pin and a pivotable arm moveable by a solenoid and acting on said pin so that said pin moves from a first position to a second position engaging said agitator.

2. The machine of claim 1 wherein said shaft assembly is hollow and said pin is received in said shaft assembly.

3. The machine of claim 1 wherein said means to release further includes a spring to return said pin to the first position.

4. The machine of claim 1 wherein said agitator includes a socket and said shaft assembly includes a driver received in said socket.

5. The machine of claim 4 wherein said driver includes a flange and said agitator includes means to engage said flange.

6. The machine of claim 5, wherein said pin is moveable through said driver, said socket having a bottom surface engageable by said pin to release said means to engage said flange from said flange.

7. The machine of claim 4 wherein said shaft assembly includes a shaft portion carrying said driver.

8. A machine for mixing food products comprising a rotatable shaft assembly, an agitator carried by said shaft assembly and adapted to mix the food products, and means to release said agitator from said shaft assembly, wherein said agitator includes a socket, wherein said shaft assembly includes a shaft portion carrying a driver received in said socket, and wherein said shaft assembly includes a slinger disk carried by said shaft portion.

9. The machine of claim 7 further comprising a motor, and a pulley turned by said motor, said shaft portion being carried by said pulley.

10. A machine for mixing food products comprising a rotatable hollow shaft assembly, an agitator carried by said hollow shaft assembly and adapted to mix the food products, a plunger having a pin received in said hollow shaft assembly, and means to move said pin through said hollow shaft assembly to engage said agitator to remove said agitator from said hollow shaft assembly, wherein said means to move said pin includes a pivotable arm moveable by a solenoid and acting on said pin so that said pin moves from a first position to a second position engaging said agitator.

11. The machine of claim 10 further comprising a spring to return said pin to the first position.

12. The machine of claim 10 wherein said agitator includes a socket and said hollow shaft assembly includes a driver received in said socket.

13. The machine of claim 12 further comprising a motor, a pulley turned by said motor, and a shaft portion attached to said pulley at one end and attached to said driver at the other end.

14. The machine of claim 12 wherein said driver includes a flange and said agitator includes means to engage said flange.

15. The machine of claim 14, said socket having a bottom surface, said pin engaging said bottom surface to release said means to engage said flange.

\* \* \* \* \*